United States Patent [19]
Parvi et al.

[11] 3,897,472
[45] July 29, 1975

[54] POLYHALOGENATED POLYISOCYANATES

[75] Inventors: Ludovic Parvi, Pont-de-Claix;
Arsene Isard, Grenoble, both of France

[73] Assignee: Produits Chimiques Ugine Kuhlmann, Paris, France

[22] Filed: Jan. 17, 1973

[21] Appl. No.: 324,351

Related U.S. Application Data

[63] Continuation of Ser. No. 13,844, Feb. 24, 1970, abandoned.

[52] U.S. Cl....260/453 AR: 260/77.5 AT; 260/570 R; 260/576
[51] Int. Cl............................................. C07c 119/04
[58] Field of Search ...................... 260/453 AR, 581

[56] References Cited
UNITED STATES PATENTS 2,829,164  4/1958  Rocklin........................... 260/581 X
3,308,158  3/1967  Szobel et al. ..................... 260/453 X
3,480,673  11/1969  Smith............................. 260/453 X

*Primary Examiner*—Lewis Gotts
*Assistant Examiner*—Dolph H. Torrence
*Attorney, Agent, or Firm*—Pennie & Edmonds

[57] ABSTRACT

This invention relates to polyisocyanates prepared by reacting phosgene with an amine of formula

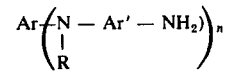

wherein Ar and Ar' are each an aromatic radical, R is hydrogen or an alkyl radical, and $n$ is 2 or 3.

3 Claims, No Drawings

POLYHALOGENATED POLYISOCYANATES

This is a continuation of application Ser. No. 13,844, filed Feb. 24, 1970, now abandoned.

DESCRIPTION OF PRIOR ART

It has previously been proposed to prepare chlorinated diisocyanates by the chlorination of the usual diisocyanates such as toluylene-diisocyanate, diphenylmethane-diisocyanate, etc, but this method presents many drawbacks. For example the carbamyl chloride, which is intermediarily formed by this process, is decomposed during the preparation of the isocyanate, and must be formed and then decomposed another time. The process is further complicated by the difficulties encountered in removal of the residual chlorine and the catalyst. The chlorination conditions, which become more severe as the degree of chlorination sought increases, are responsible for the formation of residues and polymers. Therefore, attempts to obtain products containing more than 10% of chlorine on the isocyanate are often abandoned. Lastly, when the starting isocyanate comprises aliphatic chains, the chlorination causes cleavage reactions and the formation of chloromethylated compounds which introduces labile chlorine into the product.

In order to avoid these drawbacks, it has been proposed to produce isocyanates, by phosgenation, of polyhalogenated aromatic amines on the same nucleus, but in this case the transformation of the amine groups is very difficult and can only be brought to a conclusion under unusually severe phosgenation reaction conditions.

SUMMARY OF INVENTION

This invention relates to novel polyhalogenated polyisocyanates having the following general formula:

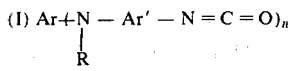

wherein
Ar represents a polyhalogenated aromatic radical, such as polyhalophenyl, polyhalobiphenyl, polyhaloterphenyl, and polyhaloquaterphenyl.

Ar' represents an aromatic radical such as phenylene, toluylene, biphenylene, diphenylmethylene and naphthylene, and monohalogenated or polyhalogenated derivatives thereof such as chlorophenylene and chlorobiphenylene.

R represents hydrogen or an alkyl radical containing 1 to 4 carbon atoms, and n is a number equal to 1, 2 or 3.

The invention also relates to a novel process for preparing the polyhalogenated polyisocyanates by reacting phosgene with polyhalogenated aromatic amines of the general formula:

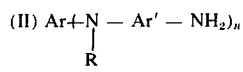

wherein Ar, Ar', R, and $n$ have the same definition as hereabove.

The invention also includes a novel process of producing mixtures of isocyanates by reacting a mixture of the amines of formula II and amines having the general formula:

(III)    $NH_2 - Ar'' - NH_2$ wherein Ar'' represents an aromatic radical such as phenylene, toluylene, biphenylene, diphenylmethylene, and naphthylene, or monohalogenated or polyhalogenated derivatives thereof such as chlorophenylene, chlorobiphenylene, etc. whereby mixtures of isocyanates are obtained of the following general formula:

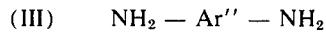

and (IV)    $OCN - Ar'' - NCO$ in which Ar, Ar', R and $n$ have the same meanings as assigned above.

DESCRIPTION OF THE PREFERRED EMBODIMENT

Examples of amines that can be used according to formula III include m-phenylenediamine, p-phenylenediamine, toluylenediamine, benzidine, methylenedianiline, naphthylenediamine 1-4, etc., and halogenated derivatives thereof such as chloro-4-phenylenediamine, chloro-2-benzidine, etc.

The reaction can also be carried out in the reaction medium resulting from the condensation of the amines of formula III with a polyhalogenobenzene, a polyhalogenobiphenyl, a polyhalogenoterphenyl etc. which medium contains a mixture of amines of formula II and III. For a further disclosure of the above products and process reference is made to U.S. Pat. No. 3,308,158 and copending U.S. appplications Ser. No. 685,306 filed Nov. 24, 1967 and Ser. No. 862,032 filed Sept. 29, 1969 assigned to the same assignee of this application. Both of the above U.S. applications are incorporated herein by reference. By following the above procedure, a mixture of isocyanates of formula I and of formula IV, namely, $OCN - Ar'' - NCO$ are obtained. In this case Ar' is the same as Ar''.

The following examples illustrate the invention:

EXAMPLE 1

Into a reaction vessel equipped with a stirring device, 499 g of decachlorobiphenyl, 1,235 g of m-phenylenediamine and 424 g of sodium carbonate were introduced and the reaction mixture was then heated at 230°C under a nitrogen atmosphere. This temperature was maintained for 5 hours. The reaction mixture was then cooled down to about ambient temperature, mixed with a mixture of benzene and acetone, and then filtered. In order to remove the excess of m-phenylenediamine, the filtrate was treated with the calculated quantity of hydrochloric acid sufficient to effect neutralization. The benzene layer was washed with water, then with aqueous solution of diluted NaOH, and once again with water. Finally, the solvent was evaporated and a product obtained analyzing or titrating 43.5% of chlorine and 8.2% of nitrogen.

EXAMPLE 2

230 g of the product of Example 1 were dissolved in 1 liter of monochlorobenzene and treated with a phosgene solution in monochlorobenzene, first at about 5°C, then the temperature was progressively raised to 80°C over a two hour period and then up to 130°C over a three hour period. The total quantity of phosgene introduced was to 2.8 moles. Nitrogen was bubbled through the reaction mixture for one hour in order to remove the hydrochloric acid and the dissolved phosgene. The solvent was then evaporated. 245 g of a brown solid was collected which contained 42% chlorine and 0.26 g per 100 g of isocyanate groups.

EXAMPLE 3

A mixture of 110 g of decachlorobiphenyl, 190 g of m-phenylenediamine and 94 g of sodium carbonate were reacted in the same manner as in Example 1. After the reaction, the mixture while still hot was mixed with 800 cm3 of monochlorobenzene and was filtered. The filtrate was placed into a reaction vessel and 15 moles of phosgene was progressively introduced therein, according to the same procedure as set forth in Example 2. After reacting, the gas was removed, the resulting product was filtered and concentrated, and 253 g of a viscous product were recovered titrating 0.75 isocyanate group per 100 g and 21% of chlorine.

EXAMPLE 4

A mixture of 749 g of decachlorobiphenyl, 1,782 g of methylenedianiline and 636 g of sodium carbonate was heated at 250°C for 5 hours under nitrogen. After cooling down the reaction mixture, the excess methylenedianiline was eliminated following the procedure of Example 1, 1.225 g of a brown product were recovered analyzing or titrating 34.8% of chlorine and having 0.23 $NH_2$ group per 100 g.

EXAMPLE 5

226 g of the product obtained in Example 4 were dissolved in 1.2 liter of monochlorobenzene, and a solution of phosgene in monochlorobenzene progressively introduced into this mixture while raising the temperature from 5°C to 80°C over a three hour period, then to 130° over a two hour period. Nitrogen was then bubbled through the reaction mixture for one hour before removing the solvent by evaporation. 240 g of a product were recovered analyzing or titrating 35.4% of chlorine and 0.22 isocyanate group per 100 g.

EXAMPLE 6

A mixture of 150 g of decachlorobiphenyl, 359 g of methylenedianiline and 127.5 g of sodium carbonate were heated for five hours at 250°C under nitrogen. The reaction mixture was then mixed with 1 liter of monochlorobenzene and was filtered. The filtrate was introduced into a reaction vessel and treated under the conditions according to Example 5 with a solution of phosgene (12 moles) in monochlorobenzene. The product obtained analyzed or titrated 17% of chlorine and 0.49 isocyanate group per 100 g.

EXAMPLE 7

The process of Example 4 was repeated except that decachlorobiphenyl was substituted by a corresponding quantity of decabromobiphenyl, i.e. 1,416 g. The product obtained which analyzed or titrated 52% of bromine and 4.6% of nitrogen was treated with a solution of phosgene as in the previous examples. The resulting diisocyanate titrated 50% bromine and 0.17 isocyanate group per 100 g.

The phosgenation of the amines corresponding to formula II or mixtures thereof with an amine corresponding to formula III can be carried out according by the usual phosgenation procedures known to those skilled in the art. The process can be carried out continuously or in batch. The reaction is preferably carried out in the presence of a solvent such as toluene, xylene, monochlorobenzene, and so forth. It is advantageous to use an excess of phosgene, that is about 2 to 10 moles of phosgene. The reaction can generally be carried out at a temperature from 0° to 100°C, but can be raised to a temperature of 180°C at the end of the reaction if desired, but this will depend upon the solvent medium being used for the reaction.

The isocyanate products of this invention can be polymerized to form polyurethane having improved flame resistance. They can be polymerized in the same manner as conventional isocyanates as is well known in the art.

We claim:

1. Isocyanates having the general formula

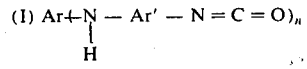

wherein Ar represents a polychlorinated aromatic hydrocarbon radical selected from the group of polychlorophenyl, polychlorobiphenyl, polychloroterphenyl, and polychloroquaterphenyl or a polybrominated aromatic hydrocarbon radical selected from the group of polybromophenyl, polybromobiphenyl, polybromoterphenyl, and polybromoquaterphenyl; Ar' represents an aromatic hydrocarbon radical selected from the group of phenylene, toluylene, biphenylene, diphenylmethylene, and naphthylene, said radicals being unsubstituted or substituted with one or more chloro or bromo atoms; and n is equal to 2 or 3.

2. The isocyanates of claim 1 in which Ar' is a chlorophenylene or chlorobiphenylene radical.

3. The isocyanates of claim 1 in which Ar represents a perchlorinated or perbrominated aromatic radical.

* * * * *